United States Patent
Bayyouk et al.

(10) Patent No.: US 12,222,054 B2
(45) Date of Patent: Feb. 11, 2025

(54) SWIVEL ASSEMBLY FORMED OF A CORROSION-RESISTANT MATERIAL

(71) Applicant: SPM Oil & Gas Inc., Fort Worth, TX (US)

(72) Inventors: Jacob Bayyouk, Richardson, TX (US); Brian Witkowski, Weatherford, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 21 days.

(21) Appl. No.: 17/858,282

(22) Filed: Jul. 6, 2022

(65) Prior Publication Data
US 2024/0011587 A1    Jan. 11, 2024

(51) Int. Cl.
*F16L 27/08* (2006.01)
*E21B 17/05* (2006.01)
*F16L 58/18* (2006.01)

(52) U.S. Cl.
CPC .......... *F16L 27/0845* (2013.01); *E21B 17/05* (2013.01); *F16L 58/18* (2013.01)

(58) Field of Classification Search
CPC ........ F16L 27/0845; F16L 58/18; E21B 17/05
See application file for complete search history.

(56) References Cited

U.S. PATENT DOCUMENTS

| | | | | |
|---|---|---|---|---|
| 4,375,715 A | * | 3/1983 | Dorman | F16L 27/0828 285/916 |
| 4,407,533 A | * | 10/1983 | Giebeler | F16L 27/0832 285/365 |
| 5,538,296 A | * | 7/1996 | Horton | F16L 27/0824 285/276 |
| 7,658,417 B2 | | 2/2010 | Barker | |
| 10,683,708 B2 | | 6/2020 | Hill et al. | |
| 11,098,829 B2 | | 8/2021 | Nguyen | |
| 11,149,885 B2 | | 10/2021 | Witkowski et al. | |
| 11,555,564 B2 | * | 1/2023 | Baker | E21B 17/043 |
| 2006/0131873 A1 | | 6/2006 | Klingbail et al. | |

(Continued)

FOREIGN PATENT DOCUMENTS

DE    29909921.8 U1    11/2000

OTHER PUBLICATIONS

Product Brochure: "The SolNit Process. For Steels that break new quality barriers," Ipsen International GmbH, 4 pages (2009).

(Continued)

*Primary Examiner* — James M Hewitt, II
(74) *Attorney, Agent, or Firm* — Foley & Lardner LLP (57) ABSTRACT

A swivel assembly for oilfield operations, the swivel assembly including a first pipe section having a first end fitting and a second pipe section having a second end fitting corresponding to and receiving the first end fitting, each of the first and second end fittings having an inner surface and an outer surface. The swivel assembly further includes a swivel joint rotatably securing, via the corresponding first and second end fittings, the first and second pipe sections together along a central axis to define a fluid passageway therethrough. At least a portion of one of the first pipe section and the second pipe section is formed of a corrosion-resistant material having a first hardness and at least a portion of the swivel joint is formed having a second hardness different from the first hardness.

15 Claims, 3 Drawing Sheets

(56) References Cited

U.S. PATENT DOCUMENTS

| | | |
|---|---|---|
| 2010/0059285 A1 | 3/2010 | Carlström et al. |
| 2013/0248009 A1 | 9/2013 | Williams et al. |
| 2017/0299096 A1 | 10/2017 | Nowell et al. |
| 2018/0306358 A1 | 10/2018 | Witkowski et al. |
| 2020/0347971 A1 | 11/2020 | Schramm et al. |
| 2022/0307454 A1* | 9/2022 | Guzman Trevino ........................ F02M 55/005 |

OTHER PUBLICATIONS

GB Search Report for GB Patent Appln. No. 2308986.5, mailed Dec. 12, 2023 (3 pgs).

* cited by examiner

SWIVEL ASSEMBLY FORMED OF A CORROSION-RESISTANT MATERIAL

TECHNICAL FIELD

The present disclosure relates to swivel assemblies for high pressure well service applications and, in particular, to a swivel assembly having a hardened swivel joint.

BACKGROUND

High pressure well service applications require the use of swivel assemblies to interconnect various piping configurations. A swivel assembly typically includes male and female fittings that are joined and sealed, but which permit swivel action between them, such as rotation or pivoting action. Circumferential bearing raceways are formed in the male and female fittings to capture ball bearings therebetween to facilitate the swiveling action. Swivel joints are required to perform under extreme conditions, such as handling fluids that contain abrasives that cause erosion of the joint components, high pressures, and extreme temperatures.

The swivel assemblies are often formed of multiple pipe sections of low alloy steel, for example, having 4715, 4120, 4121 grades and the like. However, to facilitate a rotational movement of the components of the swivel assemblies, the raceways require hard surfaces configured to dispose the bearings therein. Typically hardening is performed using different heat treatment methods, e.g. heat-treating the respective surfaces of the raceways defined in both ends of the first and second pipes and the respective adjacent surfaces. In one example, such heat treatment achieves a hardness of the raceway surfaces in a range between 58 and 62 HRC (Hardness Rockwell C).

Corrosion, pitting, as well as erosion assisted corrosion oftentimes occur within certain areas of the pipe sections. As a result of such corrosion and pitting, the pipe sections may have an increased stress concentration, which can contribute to cracking causing failure of the swivel assemblies. There is a need to address these deficiencies.

SUMMARY

According to a first aspect, there is provided a swivel assembly for oilfield operations that includes: a first pipe section having a first end fitting and a second pipe section having a second end fitting corresponding to and receiving the first end fitting, wherein each of the first and second end fittings have an inner surface and an outer surface. In some embodiments, the swivel assembly also includes a swivel joint rotatably securing, via the corresponding first and second end fittings, the first and second pipe sections together along a central axis to define a fluid passageway therethrough. In some embodiments, the swivel assembly may have a portion of the first pipe section and/or the second pipe section that is/are formed of a corrosion-resistant material having a first hardness. In some embodiments, the swivel joint may have another portion of the first pipe section and/or the second pipe section having a second hardness different from the first hardness. While the first hardness and the second hardness are described herein as different from each other, it should be understood that the first hardness and the second hardness can be the same hardness.

In some embodiments, the swivel joint may have a plurality of raceways sized to receive a plurality of bearings therein to facilitate a rotatable connection between the first and second pipe sections. In some embodiments, the swivel assembly may be formed of a corrosion-resistant material, such as, for example, one or any combination of steel materials having the following grades: X20Cr13, X36CrMo17 (1.2316), X17CrNi16-2 (1.4057), X48Cr13 (1.4034), F6NM, 9Cr, and X10CrMoVNb9-1Mod.

In other embodiments, the swivel assembly may have a portion of the first end fitting and/or the second end fitting that is/are heat-treated to increase hardness thereof. In some embodiments, the swivel assembly may have a portion of the first pipe fitting and/or the second pipe fitting that is/are heat-treated using one or any combination of the following heat-treatment methods: carburizing, induction heat-treatment, nitriding, as well as quench and tempering optimization.

In yet another embodiment, the swivel assembly may be heat-treated throughout an entirety of the first end fitting and/or the second end fitting to increase hardness thereof. In some embodiments, the swivel assembly may have a sealing element between the first end fitting and the second pipe section, such that the sealing element is configured to sealingly engage the first end fitting and the second pipe section.

According to a second aspect, there is provided a swivel assembly that includes a first pipe section formed of a corrosion-resistant material having a first end fitting that has an inner surface and an outer surface, wherein the first pipe section has a first hardness value. In some embodiments, the swivel assembly also includes a second pipe section formed of a corrosion-resistant material having a second end fitting that has an inner surface and an outer surface, wherein the second pipe section has a second hardness value. In some embodiments, the swivel assembly also includes a swivel joint that rotatably secures the first and second end fittings together along a central axis. In some embodiments, the swivel joint may have a hardness value greater than the hardness of the first and second hardness values.

In some embodiments, the swivel assembly may be formed of a corrosion-resistant material, such as, for example, one or any combination of steel materials having the following grades: X20Cr13, X36CrMo17 (1.2316), X17CrNi16-2 (1.4057), X48Cr13 (1.4034), F6NM, 9Cr, and X10CrMoVNb9-1Mod.

In other embodiments, the swivel assembly may have a portion of the first end fitting and/or the second pipe fitting that is/are heat-treated to increase hardness thereof. In some embodiments, such heat-treating may include one or any combination of the following heat-treatment methods: carburizing, induction heat-treatment, nitriding, as well as quench and tempering optimization.

According to a third aspect, there is provided a method of manufacturing a swivel assembly that includes: forming a hardened first area on at least a portion of an outer surface of a first end fitting of a first pipe section formed of a corrosion-resistant material. In some embodiments, the hardened first area has a hardness value greater than a hardness value of a non-hardened or lesser hardened first area of the outer surface of the first pipe section. In some embodiments, the hardened first area includes at least one groove defined on an outer surface thereof, wherein the at least one first area groove is configured to fit a plurality of ball bearings therein.

In some embodiments, the method also includes forming a hardened second area on at least a portion of an inner surface of a second end fitting of a second pipe section formed of a corrosion-resistant material. In some embodiments, the hardened second area has a hardness value greater than a hardness value of a non-hardened or lesser hardened second area of the inner surface of the second pipe section. In some embodiments, the hardened second area includes at least one groove defined on an inner surface thereof, wherein the at least one second area groove is configured to align with the at least one first area groove to define at least one raceway therebetween when the swivel assembly is fully assembled.

In still other embodiments, the method also includes inserting the hardened first area of the first end fitting into the hardened second area of the second end fitting thereby fluidly coupling the first and second pipe sections via the swivel assembly. In some embodiments, the method also includes disposing the plurality of ball bearings into the at least one raceway of the swivel assembly.

In yet another embodiment, the method may include forming the swivel assembly from a corrosion-resistant material, such as, for example, one or any combination of steel materials having the following grades: X20Cr13, X36CrMo17 (1.2316), X17CrNi16-2 (1.4057), X48Cr13 (1.4034), F6NM, 9Cr, and X10CrMoVNb9-1Mod.

In still other embodiments, the method may include forming the hardened second area further including heat-treating the hardened second area. In some embodiments, the method may include forming the hardened first area further including heat-treating the hardened first area. In some embodiments, forming at least one of the hardened second area and/or the hardened first area may include one or any combination of the following heat-treatment methods: carburizing, induction heat-treatment, nitriding, as well as quench and tempering optimization.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

Figure 1:
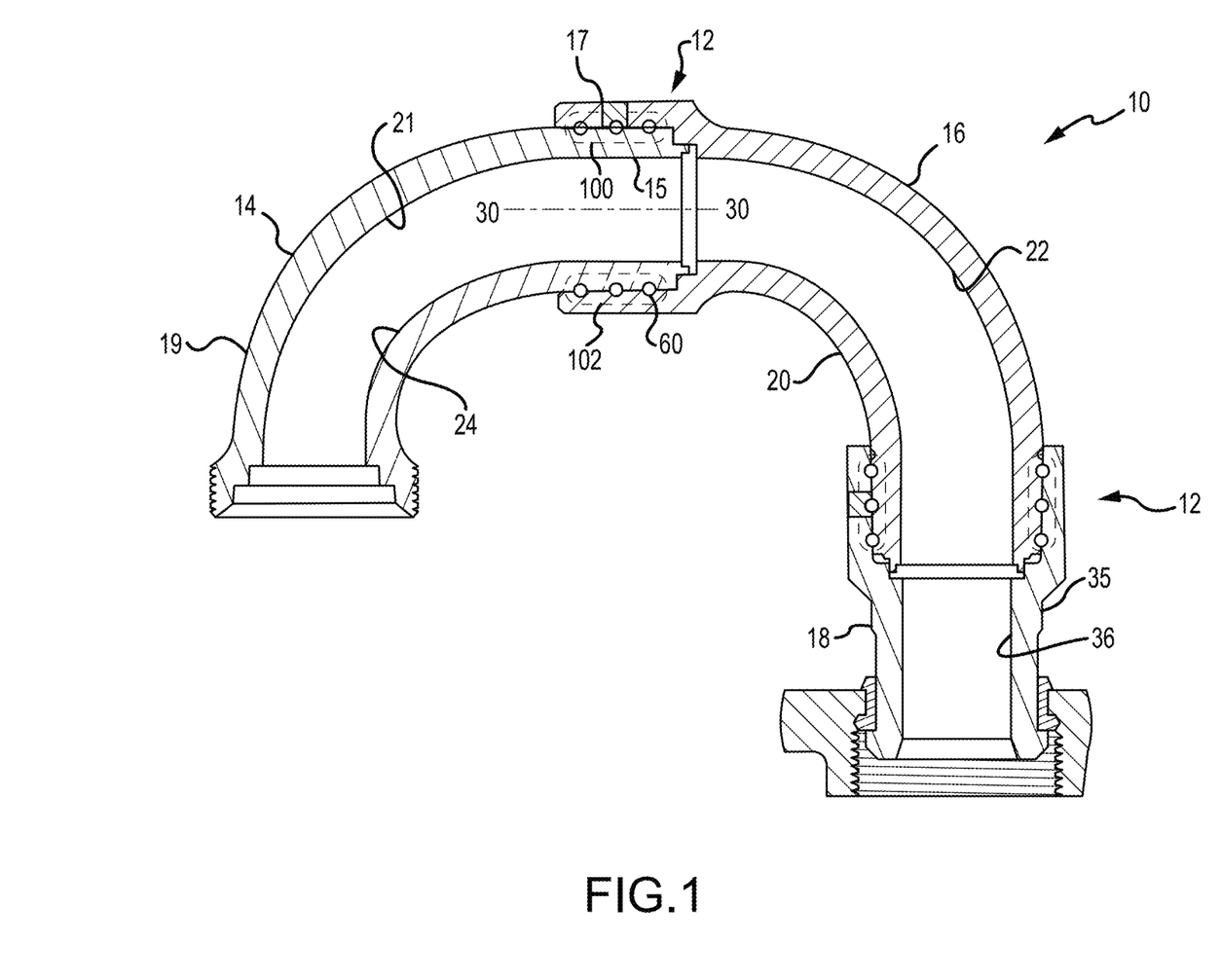
FIG. 1 illustrates a section view of a swivel assembly formed of a corrosion-resistant material, in which a portion of the swivel joint includes a hardened area.
Figure 2:
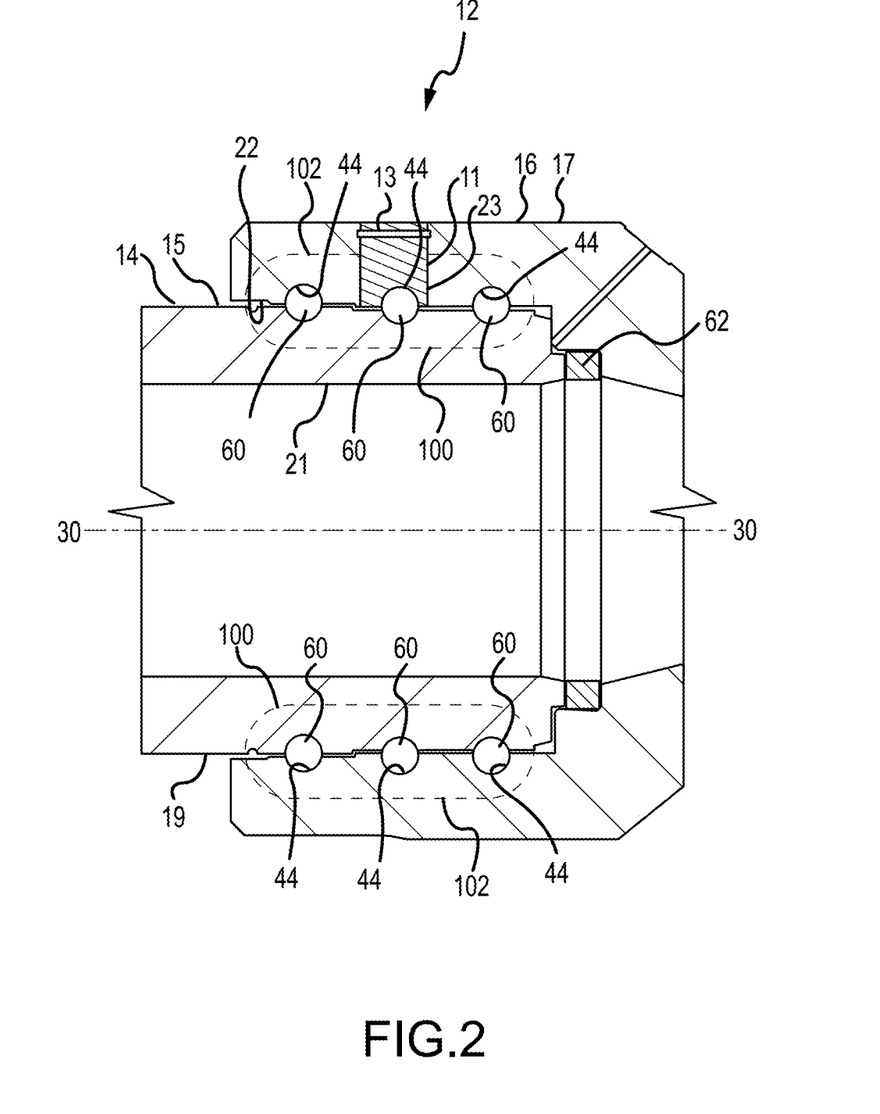
FIG. 2 illustrates a detail view of a portion of the swivel assembly of FIG. 1.
Figure 3:
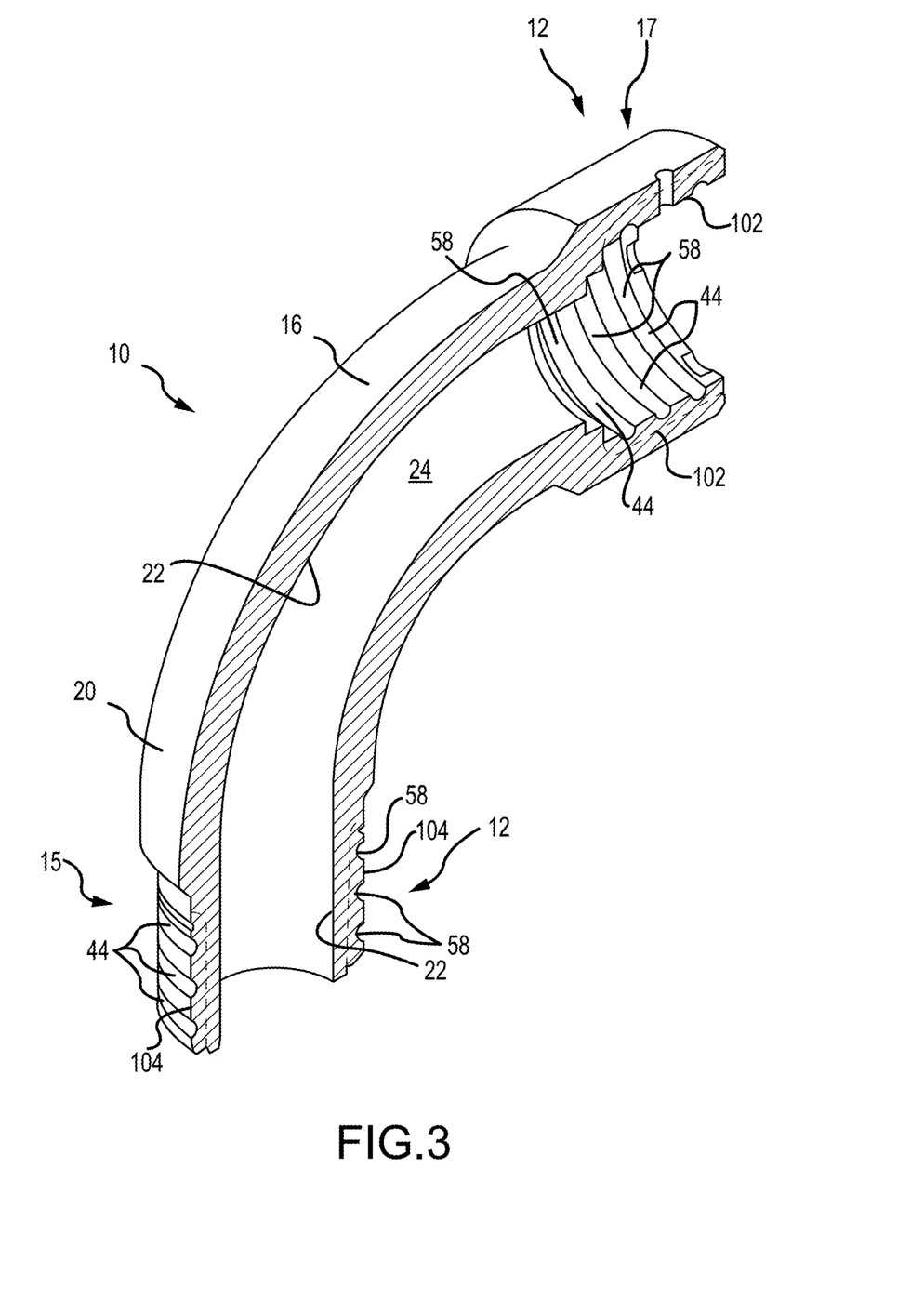
FIG. 3 illustrates a section view of a section of the swivel assembly of FIG. 1.

FIGS. 1-3 illustrate an embodiment of a swivel assembly 10 formed of a corrosion-resistant material in which a hardened swivel joint 12 is employed to advantage. According to some embodiments, the corrosion resistant material is formed of a stainless steel, including for example, grades of stainless steel comprising X20Cr13, X36CrMo17 (1.2316), X17CrNi16-2 (1.4057), X48Cr13 (1.4034), F6NM, 9Cr, and X10CrMoVNb9-1Mod that exhibit properties of corrosion-resistance.

Referring specifically to FIG. 1, the swivel assembly 10 includes a first pipe section 14, a second pipe section 16, and a third pipe section 18, each rotatable with respect to each other via a respective swivel joint 12. In the embodiment illustrated in FIG. 1, each of the pipe sections 14, 16 and 18 are formed having outer surfaces 19, 20, 35 and inner surfaces 21, 22, 36, at least a portion of the inner surfaces 21, 22, 36 forming a fluid passageway 24 for directing fluid through the swivel assembly 10 during operation. It should be understood, however, that the swivel assembly 10 may be otherwise configured. For example, in some embodiments, the swivel assembly 10 may include a greater or fewer number of pipe sections 14, 16 and/or 18 and associated swivel joints 12.

During operation, corrosion, pitting, as well as erosion assisted corrosion. This results in reduced wall thickness, thus, compromising ability of the wall to sustain the high working pressure; further, the pitting results in a substantially higher stress concentration factor and, in turn, accelerates formation of cracks that leads to component fracturing and/or bursting of the pipe sections 14, 16 and/or 18. To reduce or substantially eliminate the likelihood of such cracking, the pipe sections 14, 16 and/or 18 may be formed of a corrosion-resistant material, such as, for example, a stainless steel grade material or a polycarbonate material. However, and as explained in greater detail below, in order to maintain sufficient hardness within the swivel joints 12 to reduce and/or substantially eliminate the likelihood of damage thereto, at least a portion of the swivel joints 12 may be treated (e.g., heat-treated or otherwise) in order to provide surfaces with increased hardness that are more conducive to typical operating conditions.

Referring specifically to FIGS. 1 and 2, the swivel joint 12 is formed having a first pipe section 14 having a first end fitting 15 and a second pipe section 16 having a second end fitting 17. In the embodiment illustrated in FIGS. 1 and 2, the first end fitting 15 defines a male fitting and the second end fitting 17 defines a female fitting that corresponds to the male fitting. The female fitting is sized to receive at least a portion of the male fitting therein so as to coaxially interconnect the first and second end fittings 15, 17 along a central axis 30. In operation, the swivel joint 12 permits the male and female fittings, and thus, pipe sections 14 and 16 to pivot and/or otherwise rotate, in relation to each other, about the central axis 30 while still maintaining a high pressure seal therebetween.

With continued reference to the embodiment illustrated in FIGS. 1 and 2, the swivel joint 12 includes the second end fitting 17 of the second pipe section 16 positioned at least partially around the first end fitting 15 of the first pipe section 14. As explained in greater detail below, the male end fitting and the female end fitting can be treated to form a hardened first area 100 and a hardened second area 102, respectively, wherein a plurality of raceways 44 are defined (see, e.g., FIG. 2). In use, a plurality of ball bearings 60 are disposed within corresponding ones of the plurality of the raceways 44 to facilitate the rotational movement of the swivel joint 12. While FIGS. 1 and 2 illustrate the plurality of bearings as the ball bearings 60, it should be understood that the bearings 60 may be roller bearings or ball bearings, such as, for example, linear roller bearings, or any other type of bearings.

When the second end fitting 17 of the second pipe section 16 is disposed around the first end fitting 15 of the first pipe section 14, the inner surface 22 of the second end fitting 17 is positioned adjacent the outer surface 19 of the first end fitting 15 so as to provide surfaces to accommodate the raceways 44. In particular, and with specific reference to FIGS. 2 and 3, the inner surface 22 of the second end fitting 17 includes a plurality of grooves 58 (FIG. 3), which are positioned and otherwise formed on the inner surface 22 to align with a plurality of corresponding grooves 58 (FIG. 3) that are positioned and otherwise formed on the outer surface 19 of the first end fitting 15, the grooves 58 forming the raceways 44, such that, when aligned, the raceways 44 support a plurality of ball bearings 60 therein. In some embodiments, a plug 11 and a pin 13 may be used to close a passageway 23, through which the plurality of ball bearings 60 are inserted within the at least one raceway 44. According to some embodiments, a sealing element 62 is disposed between an end of the first end fitting 15 and the inner surface 22 of the second pipe section 16. The sealing element 62 substantially eliminates or prevents leakage of fluid from the passageway 24 to an annular area between the outer surface 19 and the inner surface 22, (e.g., the annular area where the raceways 44 are defined and the plurality of ball bearings 60 are disposed).

During extensive operations, it is common for the swivel joint to undergo or otherwise be exposed to stresses due to frequent movement of the frac lines (e.g., pipes) connected to the swivel assembly 10. Additionally, fluid flow within the frac lines (e.g., with high pressure, high velocity, and/or high turbulence) can cause damaging stresses. Therefore, the swivel assembly 10 should preferably have a sufficient ductility to withstand such stresses. For example, the pipe sections 14, 16 and/or 18 may be formed of stainless steel material having at least one of the following grades: X20Cr13, X36CrMo17 (1.2316), X17CrNi16-2 (1.4057), X48Cr13 (1.4034), F6NM, 9Cr, and/or X10CrMoVNb9-1Mod, having, for example, chemical compositions shown in Tables 1-7. However, the raceways 44 within the pipe sections 14, 16 and/or 18 must have hard surfaces sufficient for receiving and supporting the plurality of bearings 60 during operation. For example, a regular hardness of low alloy steel of grade 4715, which is within a range of about 30 to about 39 HRC (Hardness Rockwell C), that is used in association with a pipe section 14, 16 and/or 18 (in particular, within the raceways 44 wherein the plurality of bearings 60 are disposed) is insufficient to withstand typical operating stresses within the swivel joints 12. As such, in some embodiments, at least a portion of the swivel joints 12 may be treated to increase the hardness thereof.

TABLE 1

Chemical composition of steel grade X20Cr13.

| Elements | Range (weight %) |
|---|---|
| C | 0.16-0.25 |
| Mn | 0-1.5 |
| Si | 0-1 |
| P | 0-0.04 |
| S | 0.03-0.015 |
| Cr | 12-14 |

TABLE 2

Chemical composition of steel grade X36CrMo17 (1.2316).

| Elements | Range (weight %) |
|---|---|
| C | 0.33-0.43 |
| Mn | 0-1 |
| Si | 0-1 |
| Cr | 15-17 |
| Ni | 0-1 |
| Mo | 1-1.3 |

TABLE 3

Chemical composition of steel grade X17CrNi16-2 (1.4057).

| Elements | Range (weight %) |
|---|---|
| C | 0.12-0.22 |
| Mn | 0-1.5 |
| Si | 0-1 |
| P | 0-0.04 |
| S | 0-0.03 |
| Cr | 15-17 |
| Ni | 1.5-2.5 |

TABLE 4

Chemical composition of steel grade X48Cr13 (1.4034).

| Elements | Range (weight %) |
|---|---|
| C | 0.43-0.5 |
| Mn | 0-1 |
| Si | 0-1 |
| P | 0-0.04 |
| S | 0-0.03 |
| Cr | 12.5-14.5 |

TABLE 5

Chemical composition of steel grade F6NM.

| Elements | Range (weight %) |
|---|---|
| C | 0-0.05 |
| Cr | 11.5-14 |
| Mn | 0.5-1 |
| Mo | 0.5-1 |
| Ni | 3.5-5.5 |
| P | 0-0.03 |
| S | 0-0.03 |
| Si | 0-0.6 |

TABLE 6

Chemical composition of steel grade 9Cr.

| Elements | Range (weight %) |
|---|---|
| C | 0.09-0.15 |
| Mn | 0.3-0.6 |
| Mo | 0.9-1.1 |
| Cr | 8-10 |
| Ni | 0-0.25 |
| Cu | 0-0.25 |
| P | 0-0.02 |
| S | 0-0.01 |
| Si | 0-1 |
| Al | 0-0.04 |

TABLE 7

Chemical composition of steel grade X10CrMoVNb9-1Mod.

| Elements | Range (weight %) |
|---|---|
| Cr | 7.5-10.0 |
| Mo | 0.6-1.3 |
| Mn | 0-0.8 |

TABLE 7-continued

Chemical composition of steel grade X10CrMoVNb9-1Mod.

| Elements | Range (weight %) |
|---|---|
| Si | 0-0.6 |
| V | 0.10-0.5 |
| Ni | 0-0.4 |
| Cu | 0-0.5 |
| C | 0.06-0.2 |
| Nb | 0.06-0.1 |
| N | 0.01-0.1 |
| Al | 0-0.08 |
| P | 0-0.025 |
| S | 0-0.03 |

Referring to FIGS. 1-3, in order to accommodate an increased hardness, in some embodiments the outer surface 19 of the first pipe section 16 and the inner surface 22 of the second pipe section 16 can be specially treated to form the hardened first and second areas 100 and 102, respectively. Referring specifically to FIG. 2, the hardened first and second areas 100 and 102 form a portion of first and second end fittings 15 and 17, and in particular, the hardened first and second areas 100 and 102 are formed around and include the raceways 44. However, it should be understood that the hardened first and second areas 100 and 102 may be otherwise configured. For example, the hardened first and second areas 100 and 102 may form an entirety of the first end fitting 15 and the second end fitting 17, respectively. In other embodiments, the hardened first and second areas 100 and 102 may extend beyond the entirety of the first and second end fittings 15 and 17. Furthermore, while the embodiment illustrated in FIG. 2 illustrates the hardened first area 100 extending only partially between outer and inner surfaces 19 and 21, it should be understood that the hardened first area 100 may extend to and include both the outer and inner surfaces 19 and 21. Additionally, the hardened second area 102 is illustrated in FIG. 2 extending partially between the outer surface 20 and inner surface 22. However, it should be understood that the hardened second area 102 may extend to and include the outer and inner surfaces 20 and 22, respectively.

Several different methods may be used for hardening the hardened first and second areas 100 and 102. For example, hardening may be performed by one or more heat-treatment methods. However, with heat-treatment processes, a balance between ductility and hardness must be preserved to avoid unwanted brittleness within swivel joints 12, which can exacerbate cracking and premature failure. For example, in some embodiments the heat-treatment methods should achieve such Nitrogen diffusion through the steel surface so as to: (i) obtain sufficient hardness of surfaces in the range of 56-62 HRC; (ii) obtain a sufficient amount and sufficient depth Nitrogen diffusion through the steel surface; (iii) maintain material ductility, and/or (iv) secure minimum tensile strength requirement for the swivel joints 12.

In some embodiments, heat treatment processes and surface hardening methods may include carburizing, induction heat treatment, nitriding as well as variations of traditional nitriding, and/or quench and tempering optimization.

According to an embodiment disclosed herein, a method of manufacturing a swivel assembly 10 is provided. In the embodiment illustrated in FIGS. 1-3, a hardened first area 100 is formed on at least a portion of an outer surface 19 of a first end fitting 15 of a first pipe section 14 that is formed of a corrosion-resistant material. In some embodiments, the hardened first area 100 has a hardness value greater than a hardness value of a non-hardened first area of the outer surface 19 of the first pipe section 14. In some embodiments, the hardened first area 100 may include at least one groove 58 defined on an outer surface of the hardened first area 100, wherein the at least one first area groove 58 is configured to fit a plurality of ball bearings 60 therein.

In some embodiments, the method of manufacturing the swivel assembly 10 may include forming a hardened second area 102 on at least a portion of an inner surface 22 of a second end fitting 17 of a second pipe section 16 formed of corrosion-resistant material. In some embodiments, the hardened second area 102 has a hardness value greater than a hardness value of a non-hardened second area of the inner surface 22 of the second pipe section 16. The hardened second area 102 may include at least one groove 58 defined on an inner surface of the hardened second area 102, wherein the at least one second area groove 58 is configured to align with the at least one first area groove 58 to define at least one raceway 44 therebetween when the swivel assembly 10 is fully assembled.

The method of manufacturing the swivel assembly 10 may further include inserting the hardened first area 100 of a first end fitting 15 into the hardened second area 102 of a second end fitting 17 thereby fluidly coupling the first and second pipe sections 14 and 16, respectively, via the swivel assembly 10. In some embodiments, the method also includes disposing the plurality of ball bearings 60 into the at least one raceway 44 of the swivel assembly 10.

While the present application discloses the swivel joints 12, it should be understood that coupling fittings having the plurality of bearings disposed therein may be defined within one or more pipes, a rotary union, or any other type of rotatable fittings.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have been described in connection with what are presently considered to be the most practical and preferred embodiments and it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A swivel assembly for oilfield operations, the swivel assembly comprising:
   a first pipe section and a second pipe section, each including:
      a first end fitting at a first end, the first end fitting having a first inner surface and a first outer surface, the first outer surface defining a first diameter,
      a second end fitting at a second end opposite the first end, the second end fitting having a second inner surface and a second outer surface, the second inner surface defining a second diameter larger than the first diameter,
      wherein the first end fitting corresponds to and is sized to sealingly fit within the second end fitting;
   a swivel joint including the first end fitting of the first pipe section and the second end fitting of the second pipe section, the swivel joint rotatably securing, via the corresponding first end fitting of the first pipe section and the second end fitting of the second pipe section, the first and second pipe sections together along a central axis to define a fluid passageway therethrough such that the second inner surface radially surrounds the first outer surface relative to the central axis;
   wherein at least a portion of the first pipe section and the second pipe section is formed of a corrosion-resistant material having a first hardness; and
   wherein a portion of the first end fitting comprising a plurality of raceways defined on the first outer surface of the first pipe section and a portion of the second end fitting comprising a plurality of raceways defined on the first inner surface of the second pipe section of the swivel joint are formed of the corrosion-resistant material and are heat-treated to increase a hardness thereof to a second hardness greater than the first hardness.

2. The swivel joint of claim 1, wherein the plurality of raceways defined on the first outer surface of the first pipe section and the first inner surface of the second pipe section are sized to receive a plurality of bearings therein to define a rotatable connection between the first and second pipe sections.

3. The swivel assembly of claim 1, wherein the corrosion-resistant material comprises at least one steel grade selected from the group consisting of X20Cr13, X36CrMo17, X17CrNi16-2, X48Cr13, F6NM, 9Cr, and X10CrMoVNb9-1Mod.

4. The swivel assembly of claim 1, wherein at least a portion of one of the first end fitting of the first pipe section and the second end fitting of the second pipe section extending beyond the plurality of raceways is heat-treated to increase a hardness thereof to the second hardness.

5. The swivel assembly of claim 4, wherein the portion of one of the first end fitting and the second end fitting extending beyond the plurality of raceways is heat-treated using at least one of carburizing, induction heat-treatment, nitriding, quench and tempering optimization, or combinations thereof.

6. The swivel assembly of claim 1, wherein an entirety of at least one of the first end fitting of the first pipe section and the second end fitting of the second pipe section is heat-treated to increase a hardness thereof.

7. The swivel assembly of claim 1, further comprising a sealing element disposed between the first end fitting of the first pipe section and the second pipe section, wherein the sealing element is configured to sealingly engage the first end fitting and the second pipe section.

8. A swivel assembly comprising:
   a first pipe section formed of a corrosion-resistant material and having a first hardness value, the first pipe section having:
      a first end fitting at a first end, the first end fitting defining a first inner surface and a first outer surface, the first outer surface defining an outer diameter;
      a second end fitting at a second end opposite the first end, the second end fitting defining a second inner surface and a second outer surface, the second inner surface defining an inner diameter larger than the outer diameter of the first outer surface,
      wherein the first end fitting corresponds to and is sized to sealingly fit within the second end fitting;
   a second pipe section formed of the corrosion-resistant material and having a second hardness value, the second pipe section having at least one of the first end fitting or the second end fitting at an end of the second pipe section;
   a swivel joint, the swivel joint rotatably securing together the first pipe section and the second pipe section, via the at least one of the first end fitting or the second end fitting of the second pipe section and the corresponding first end fitting or the second end fitting of the first pipe section, along a central axis, wherein at least a portion of each of the respective first end fitting and the second end fitting of the swivel joint comprises a raceway heat-treated to increase a hardness thereof to a hardness value greater than the first and second hardness values;
   wherein the corrosion-resistant material comprises at least one steel grade selected from the group consisting of X20Cr13, X36CrMo17, X17CrNi16-2, X48Cr13, F6NM, 9Cr, and X10CrMoVNb9-1Mod, and at the swivel joint, either:
      the second end fitting of the first pipe section radially surrounds the first end fitting of the second pipe section relative to the central axis, or
      the second end fitting of the second pipe section radially surrounds the first end fitting of the first pipe section relative to the central axis.

9. The swivel assembly of claim 8, wherein at least a portion of the respective first end fitting and the second end fitting extending beyond the raceway of the swivel joint is heat-treated to increase a hardness thereof.

10. The swivel assembly of claim 8, wherein at least a portion of the respective first end fitting and the second end fitting of the swivel joint is heat-treated using at least one of carburizing, induction heat treatment, nitriding, quench and tempering optimization, or combinations thereof.

11. A method of manufacturing a swivel assembly, the method comprising:
   forming a first pipe section of a corrosion-resistant material, the first pipe section having a first end fitting at a first end and a second end fitting at a second end opposite the first end;
   forming a hardened first area on a portion of an outer surface of the first end fitting at the first end of the first pipe section, the hardened first area having a hardness value greater than a hardness value of a non-hardened first area of an inner surface of the first pipe section, and the hardened first area including a first groove defined on an outer surface thereof, the first groove configured to fit a plurality of ball bearings therein;
   forming a hardened second area on a portion of an inner surface of the second end fitting at the second end of the first pipe section, the hardened second area having a hardness value greater than the hardness value of the non-hardened first area of the inner surface of the first pipe section, and the hardened second area including a second groove defined on an inner surface thereof, the second groove sized to radially align and fit around the first groove;

forming a second pipe section of the corrosion-resistant material, the second pipe section having a third end fitting at a third end and a fourth end fitting at a fourth end opposite the third end;

forming, at the third end fitting, a hardened third area corresponding to the hardened second area of the first pipe section or, at the fourth end fitting, a hardened fourth area corresponding to the hardened first area of the first pipe section, the hardened third area or the hardened fourth area having a hardness value greater than a hardness value of a non-hardened fifth area of an inner surface of the second pipe section, wherein one of:

the hardened third area of the second pipe section includes a third groove defined on an outer surface thereof, the third groove of the second pipe section configured to radially align with the second groove of the first pipe section to define a raceway therebetween when the swivel assembly is assembled, or the hardened fourth area of the second pipe section includes a fourth groove defined on an inner surface thereof, the fourth groove of the second pipe section configured to radially align with the first groove of the first pipe section to define a raceway therebetween when the swivel assembly is assembled;

assembling the swivel assembly by inserting one of:

the first end fitting of the first pipe section into the fourth end fitting of the second pipe section such that the hardened first area of the first pipe section is adjacent to the hardened fourth area of the second pipe section, thereby fluidly coupling the first and second pipe sections via the swivel assembly, or the third end fitting of the second pipe section into the second end fitting of the first pipe section such that the hardened third area of the second pipe section is adjacent to the hardened second area of the first pipe section, thereby fluidly coupling the first and second pipe sections via the swivel assembly;

disposing the plurality of ball bearings into the raceway of the swivel assembly; and wherein the raceway comprises the corrosion-resistant material hardened via heat treating.

12. The method of claim 11, wherein the corrosion-resistant material comprises at least one steel grade selected from the group consisting of X20Cr13, X36CrMo17, X17CrNi16-2, X48Cr13, F6NM, 9Cr, and X10CrMoVNb9-1Mod.

13. The method of claim 11, wherein forming the hardened second area of the first pipe section and the hardened third area of the second pipe section includes heat-treating the hardened second area of the first pipe section and the hardened third area of the second pipe section.

14. The method of claim 11, wherein forming the hardened first area of the first pipe section and the hardened fourth area of the second pipe section includes heat-treating the hardened first area of the first pipe section and the hardened fourth area of the second pipe section.

15. The method of claim 11, wherein forming one of the hardened first area of the first pipe section, the hardened second area of the first pipe section, the hardened third area of the second pipe section, or the hardened fourth area of the second pipe section includes at least one of carburizing, induction heat treatment, nitriding, quench and tempering optimization, or combinations thereof.

* * * * *